(12) United States Patent
Macauley

(10) Patent No.: US 11,444,863 B2
(45) Date of Patent: Sep. 13, 2022

(54) LEVERAGING ACTUAL CABLE NETWORK USAGE

(71) Applicant: Harmonic, Inc., San Jose, CA (US)

(72) Inventor: William Moore Macauley, Sunnyvale, CA (US)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 17/206,672

(22) Filed: Mar. 19, 2021

(65) Prior Publication Data

US 2021/0297334 A1 Sep. 23, 2021

Related U.S. Application Data

(60) Provisional application No. 62/992,419, filed on Mar. 20, 2020.

(51) Int. Cl.
| | | |
|---|---|---|
| *H04L 43/0894* | (2022.01) | |
| *H04L 43/0823* | (2022.01) | |
| *H04L 43/50* | (2022.01) | |
| *H04L 43/103* | (2022.01) | |
| *H04N 21/61* | (2011.01) | |

(Continued)

(52) U.S. Cl.
CPC ...... *H04L 43/0894* (2013.01); *H04L 12/2801* (2013.01); *H04L 43/0847* (2013.01); *H04L 43/103* (2013.01); *H04L 43/50* (2013.01); *H04L 47/263* (2013.01); *H04L 47/38* (2013.01);

(Continued)

(58) Field of Classification Search
CPC ............ H04L 43/0894; H04L 43/0847; H04L 43/103; H04L 43/50; H04L 47/263; H04L 47/38; H04L 65/403; H04L 12/2801; H04N 7/15; H04N 21/6118; H04N 21/6168

See application file for complete search history.

(56) References Cited

U.S. PATENT DOCUMENTS

| | | | | |
|---|---|---|---|---|
| 7,145,887 B1 * | 12/2006 | Akgun | ................ | H04L 12/2801 370/321 |
| 8,433,050 B1 * | 4/2013 | Baten | .................... | H04M 3/568 379/202.01 |

(Continued)

OTHER PUBLICATIONS

International Search Report for International application No. PCT/US21/23243, dated Aug. 12, 2021.

(Continued)

*Primary Examiner* — Arvin Eskandarnia
*Assistant Examiner* — Chhian (Amy) Ling
(74) *Attorney, Agent, or Firm* — Brokaw Patent Law PC; Christopher J. Brokaw

(57) ABSTRACT

Determining a bit rate at which to deliver a packet stream over a network link. An origin device transmits over the network link unsolicited data packets to a destination device while contemporaneously transmitting over the network link a first packet stream encoded at an initial bit rate to the destination device. The origin device may be, but need not be, a content delivery network (CDN) edge node and the destination device may be, but need not be, a cable modem (CM). The origin device determines whether the network link supports delivering a second packet stream in lieu of the first packet stream encoded at a higher bit rate based, at least in part, on an amount of retransmission requests the origin device receives for packets in the first packet stream from the destination device.

15 Claims, 3 Drawing Sheets

(51) Int. Cl.
*H04L 47/263* (2022.01)
*H04L 47/38* (2022.01)
*H04L 65/403* (2022.01)
*H04N 7/15* (2006.01)
*H04L 12/28* (2006.01)

(52) U.S. Cl.
CPC ............ *H04L 65/403* (2013.01); *H04N 7/15* (2013.01); *H04N 21/6118* (2013.01); *H04N 21/6168* (2013.01)

(56) References Cited

U.S. PATENT DOCUMENTS

| | | |
|---|---|---|
| 10,291,544 B1 | 5/2019 | Guerin et al. |
| 2011/0134748 A1* | 6/2011 | Spatscheck ........... H04L 1/0083 370/216 |
| 2013/0070784 A1 | 3/2013 | Denney et al. |
| 2015/0077270 A1 | 3/2015 | Rubin |
| 2016/0072578 A1* | 3/2016 | Jin ..................... H04B 10/0793 370/461 |
| 2016/0173394 A1 | 6/2016 | Harvell |
| 2018/0338168 A1* | 11/2018 | Du Breuil ........... H04L 65/4084 |
| 2018/0359328 A1 | 12/2018 | Fablet et al. |
| 2019/0297535 A1 | 9/2019 | Andreoli-Fang et al. |
| 2021/0320820 A1* | 10/2021 | Ruan ...................... H04L 45/24 |

OTHER PUBLICATIONS

Written Opinion of the International Searching Authority for International application No. PCT/US21/23243, dated Aug. 12, 2021.

* cited by examiner

LEVERAGING ACTUAL CABLE NETWORK USAGE

CLAIM OF PRIORITY

This application claims priority to U.S. Provisional Patent Application Ser. No. 62/992,419, filed Mar. 20, 2020, entitled "Understanding and Leveraging Actual Cable Network Usage," the entire contents of which are hereby incorporated by reference for all purposes as if fully set forth herein.

FIELD OF THE INVENTION

Embodiments of the invention relate to determining actual useable bandwidth of a network link.

BACKGROUND

Many technologies, particularly those involved in the transmission of video and audio data, are required to optimize the bit rate at which a data packet stream is transmitted over a network link to provide the best possible quality of experience for the end user. At present, known approaches for selecting an optimal bit rate for transmitting a packet stream over a particular network link are simplistic. Such approaches often fail to properly model the real-world behavior of a network, as accurately capturing the nuance of network behavior is difficult and is prone to error.

Digital video is typically delivered over a packet-based network using a Content Delivery Network (CDN), such as a cable provider. In a CDN, an origin or headend server is responsible for producing or supplying video content, which may be delivered across the network to clients that requested the video content. When a particular geographical region has enough clients connecting to the CDN, an edge server is often deployed to assist with providing service to that geographical region. The role of the edge server is to receive requests from clients in that region and redirect those requests to the headend server of the CDN. While clients in a region may send multiple requests for the same video content, the edge server need only send one request for the video content to the headend server; once the edge server possess the requested video content from the headend server, the edge server may deliver the video content to any client that requests the video content in the geographical region for which the edge server is responsible. This approach thus has the advantage of saving bandwidth within the CDN between the headend and the edge servers.

A CDN may be implemented as a Converged Cable Access Platform (CCAP), which is an industry standard platform for transmitting video data and audio content. The CCAP platform is specified by CableLabs of Louisville, Colo. CableLabs has publicly issued a Remote PHY family of specifications, known as the MHAv2 specifications (Modular Headend Architecture version 2). The MHAv2 specifications describe how a CCAP platform may be separated into two components, (1) a CCAP Core located at the cable headend, and (2) a Remote PHY device (RPD), which is typically located outdoors. An RPD may be located, for example, at the junction of the fiber and coax plants in an optical node serving as a Remote PHY Node (RPN).

FIG. 1 is a block diagram of an exemplary CCAP system which includes an RPD situated inside an RPN in accordance with the MHAv2 specifications of the prior art. The RPD of FIG. 1 communicates over a digital fiber network using Ethernet/IP to other networking devices "upstream" (i.e., in the direction from the RPD to the CCAP Core). In the "downstream" direction (i.e., in the direction from the RPD to a Data Over Cable Service Interface Specification (DOCSIS) cable modem), the RPD modulates information streams (data, video, voice, etc.) into radio frequency (RF) signals that are carried over coaxial cables and demodulates similar such streams from received RF signals.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for determining an optimal bit rate at which to deliver a packet stream over a network link based on observed network conditions are presented herein. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level to avoid obscuring teachings of embodiments of the invention.

Embodiments of the invention enable a node, such as but not limited to a Content Delivery Network (CDN) edge node, to identify at what bit rate a data packet stream should be delivered over a network link to a destination device, such as a Cable Modem (CM), based on observed conditions of that network link. Embodiments may be used to carry out video bit rate selection in an adaptive bit rate streaming protocol such as HTTP Live Streaming (HLS) or Dynamic Adaptive Streaming over HTTP (DASH). Embodiments preserve a user's quality of experience in using the data packet stream while continuing to observe the impact on the bandwidth of the network link resulting from transmitting the data packet stream at a higher bit rate. Embodiments may be implemented entirely at the node sending the packet stream over the network link without requiring or involving a custom client at the destination.

Figure 1:
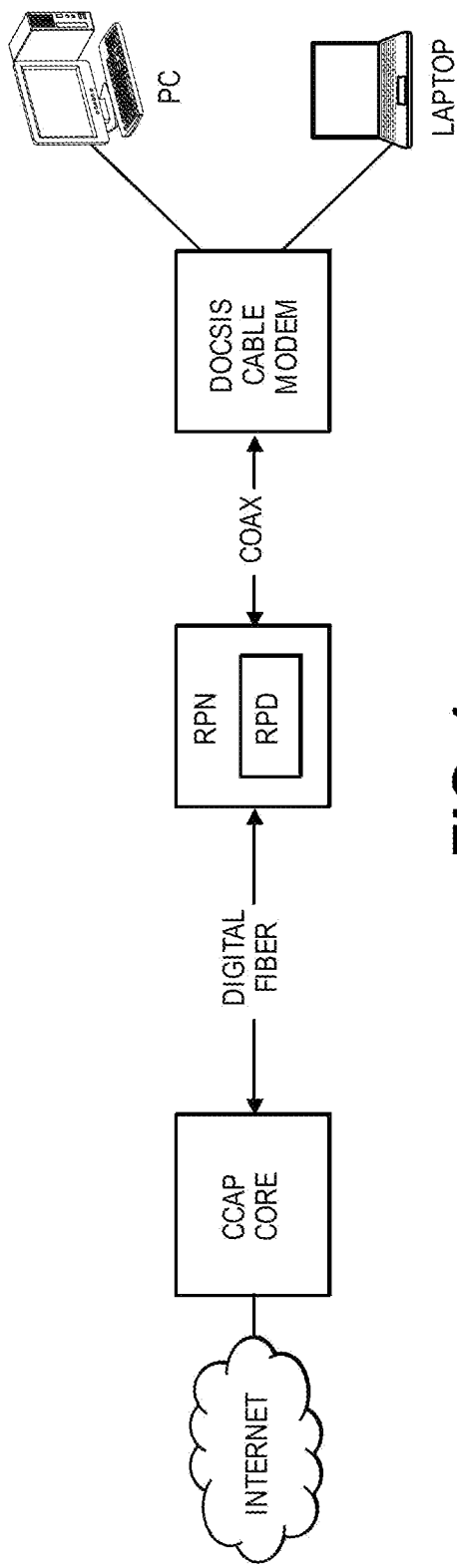
FIG. 1 is a block diagram of a CCAP system which includes a Remote PHY node (RPN) in accordance with the MHAv2 specifications of the prior art.
Figure 2:
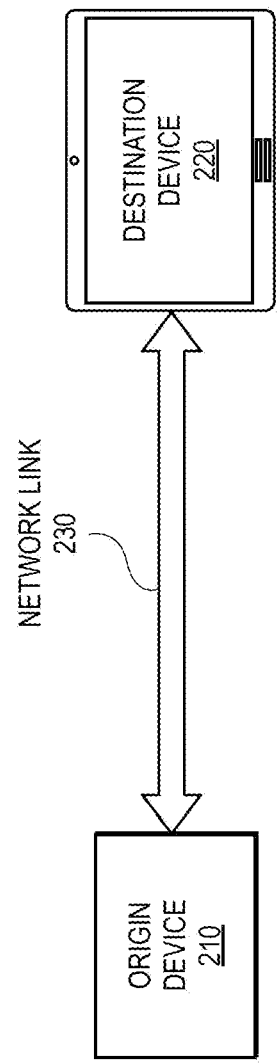
FIG. 2 is a block diagram of a content delivery network (CDN) edge node transmitting a data packet stream to a customer premises equipment (CPE) in accordance with an embodiment of the invention.

As an example of a context in which embodiments of the invention may be employed, consider FIG. 2, which is a block diagram of origin device 210 transmitting a data packet stream to destination device 220 over network link 230 in accordance with an embodiment of the invention. Origin device 210, as broadly used herein, represents any computer system capable of sending a stream of packets over network link 230. Destination device 220, as broadly used herein, represents any computer system capable of receiving a stream of packets over network link 230.

Origin device 210 and destination device 220 may be implemented in a variety of different contexts, such as a Content Delivery Network (CDN). For example, origin device 210 may correspond to a CDN Edge Node while destination device 220 may correspond to a Cable Modem (CM). As another example, origin device 210 may correspond to a server that operates at a cable headend and destination device 220 may correspond to CDN edge node.

Network link 230, as broadly used herein, represents any mechanism for exchanging data packets between origin device 210 and destination device 220. Network link 230 may be implemented, for example, by a wireless network or by a wired network. The exchange of data packets over network link 230 may be performed using a variety of different protocols, including without limitation Transmission Control Protocol (TCP) and User Datagram Protocol (UDP). To provide a concrete example, network link 230 may be implemented using a TCP connection that extends over at least 'the last mile network' to a cable customer device (i.e., customer premises equipment or (CPE)).

The effective bandwidth available to network link 230 will fluctuate over time for various reasons. For example, effective bandwidth available to network link 230 will vary based on network connections carried at any given time over network link 230. As another example, within a user's residence, radio interference can degrade the connection between the user's device consuming the video stream and any Wi-Fi router used by the user. Other sources of intermittent noise and interference in the field can degrade the available bandwidth on network link 230.

Figure 3:
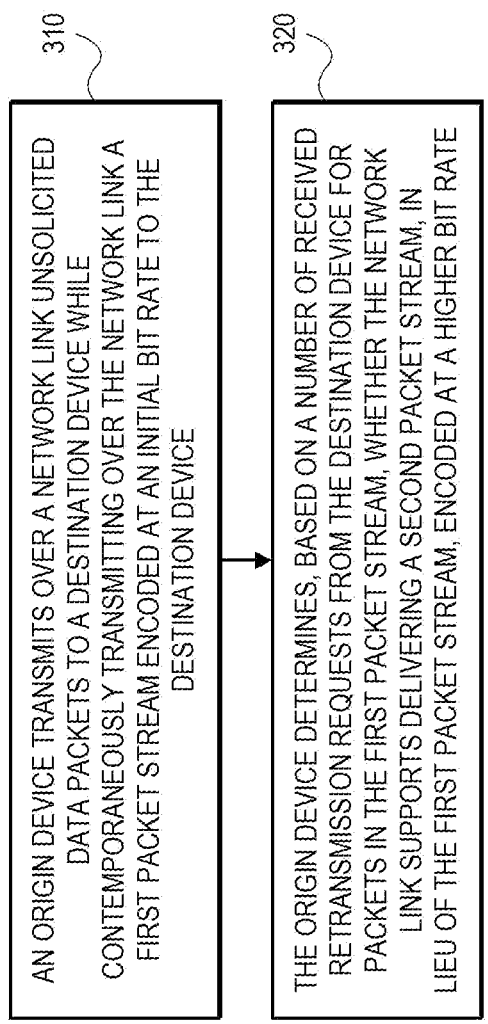
FIG. 3 is a flowchart illustrating the functional steps of determining a bit rate at which to deliver a packet stream over a network link in accordance with an embodiment of the invention.

FIG. 3 is a flowchart illustrating the functional steps of determining a bit rate at which to deliver a packet stream over a network link in accordance with an embodiment of the invention. The steps of FIG. 3 are designed to select or identify the highest bit rate at which to send a packet stream over network link 230 that is currently deemed sustainable. The objective is not simply to deliver the highest bit rate that is possible over network link 230, but rather, the objective is to maximize the user's quality of experience with the delivered packet stream. While it is true that delivering a video stream at a higher bit rate can result in a greater perceived picture quality for the viewer, the inverse can also be true. For example, increasing the bit rate of a video stream beyond what can be safely supported by the present operational conditions of a network link can lead to video stalling (which may occur when a video decoder is starved for bits to play when a selected bit rate is too high) and/or frequent switching of bit rates. In both cases, the user may perceive a shift, transition, or disruption in picture quality, which can result in a lower overall quality of experience than if the higher picture quality video was never delivered in the first place. Advantageously, embodiments preserve a user's quality of experience in using the data packet stream while continuing to observe the impact on the bandwidth of the network link resulting from transmitting the data packet stream at a higher bit rate; thus, the user's quality of experience is maximized in accordance with actual observed conditions on network link 230.

Returning to the steps of FIG. 3, in step 310, origin device 210 transmits over network link 230 unsolicited data packets to destination device 220 while contemporaneously transmitting over network link 230 a first packet stream encoded at an initial bit rate to destination device 220. The first packet stream represents the packet stream in which the user's quality of experience in using is desired to be optimized in a sustainable manner over network link 230. For example, the first packet stream may correspond to a digital video or digital content requested from a CDN or a video stream associated with an application, such as video conference software.

The unsolicited data packets may correspond to unsolicited retransmission packets per a variety of transport protocols, such as but not limited to Transmission Control Protocol (TCP) and User Datagram Protocol (UDP). The purpose of sending the unsolicited data packets is so the actual bandwidth presently available to network link 230 may be evaluated and ascertained by origin device 210. The unsolicited data packets will be dropped by the recipient client at destination device 220 if the unsolicited data packets are unneeded. It is intended that the majority of these unsolicited data packets will not be needed, as they are intended to only consume a portion of the bandwidth presently available to network link 230.

In step 320, origin device 210 determines whether the present state of network link 230 supports delivering a second packet stream in lieu of the first packet stream. The second packet stream may correspond to a different version of the first packet stream encoded at a new bit rate. This determination may be made solely at origin device 210 based on the number of retransmission requests received by origin device 210 for packets not received by destination device 220. In this way, if the amount of unsolicited data packets sent by origin device 210 to destination device 220 over network link 230 causes network link 230 to drop certain packets expected by destination device 220 beyond an acceptable threshold, then origin device 210 can ascertain the amount of available bandwidth presently available to network link 230 does not support transmitting content at a higher bit rate at present.

Embodiments may increase or decrease the amount of unsolicited data packets as needed over time until the present available bandwidth available to network link 230 is ascertained to a certain level of confidence. This process may be repeated periodically over time to continually monitor the present available bandwidth available to network link 230.

Embodiments of the invention enable a variety of different applications. For example, the steps of FIG. 3 may be used to improve human generated client or server-side bit rate optimizations for encoding, transcoding, or transmitting packet streams. As another example, the steps of FIG. 3 may be used to gather training data for artificial intelligence client or server-side bit rate optimizations for encoding, transcoding, or transmitting packet streams.

Embodiments may be used to improve the quality of software displaying video streams to one or more users. For example, in an embodiment, origin device 210 and destination device 220 may be computer systems that both execute video conference software. The video conference software executing on origin device 210 and destination device 220 may be hosting a video call. The video conference software may determine for destination device 210, using an embodiment, a new bit rate to use in transmitting video streams over network link 230 to destination device 220.

U.S. patent application Ser. No. 16/798,940 (the '940 application), was filed on Feb. 24, 2020, is entitled Automatic OFDM Profile Selection, and the entire contents of which are hereby incorporated by reference for all purposes as if fully set forth herein. This application discusses approaches for selecting an appropriate DOCSIS profile for an orthogonal frequency-division multiplexing (OFDM) channel. Embodiments of the invention may employ the modulation profile assignment techniques discussed in the '940 application to selecting an appropriate DOCSIS profile identifying a new bit rate identified by the steps of FIG. 3 for an orthogonal frequency-division multiplexing (OFDM) channel.

Figure 4:
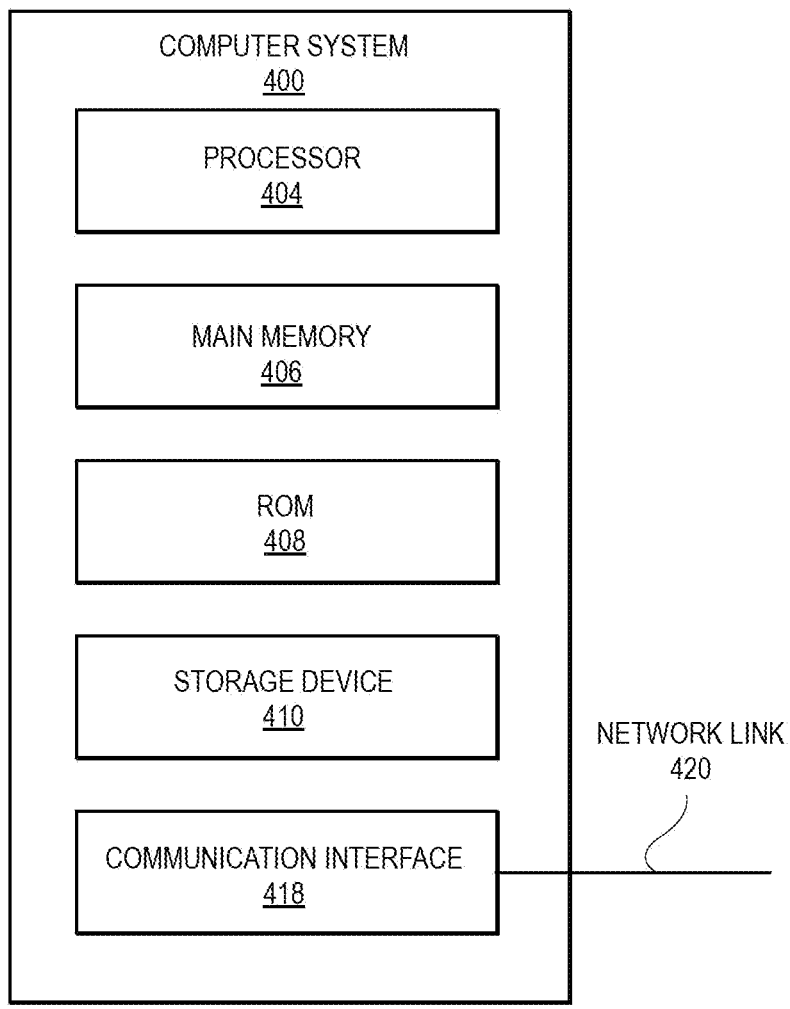
FIG. 4 is a block diagram of a computer system that may correspond to an origin device or a destination device shown in FIG. 2 in accordance with an embodiment of the invention.

FIG. 4 is a block diagram of a computer system that may correspond to an origin device 210 or a destination device 220 shown in FIG. 2 in accordance with an embodiment of the invention. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random-access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory computer-readable storage medium" as used herein refers to any tangible medium that participates in storing instructions which may be provided to processor 404 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions, which when executed by one or more processors, cause:
   determining a bit rate at which to deliver a packet stream over a network link by:
   (a) an origin device transmitting over the network link unsolicited data packets to a destination device while contemporaneously transmitting over the network link a first packet stream encoded at an initial bit rate to the destination device, wherein said unsolicited data packets are sent for purposes of placing a measurable load upon the network link and are dropped by the destination device for being unneeded, and
   (b) the origin device determining whether the network link supports delivering a second packet stream in lieu of said first packet stream, wherein said second packet stream is encoded at a new bit rate, higher than said initial bit rate, which is based on an amount of retransmission requests the origin device receives for packets in said first packet stream from said destination device.

2. The non-transitory computer-readable storage medium of claim 1, wherein said origin device is a content delivery network (CDN) edge node, and wherein said destination device is a cable modem (CM).

3. The non-transitory computer-readable storage medium of claim 1, wherein said origin device operates at a cable headend, and wherein said destination device is a content delivery network (CDN) edge node.

4. The non-transitory computer-readable storage medium of claim 1, wherein said origin device and said destination device both execute video conference software, and wherein said video conference software determines, for said destination device, the new bit rate, and wherein the new bit rate is employed by said video conference software in transmitting video streams over said network link to said destination device.

5. The non-transitory computer-readable storage medium of claim 1, wherein said first packet stream is transmitted using one or more of Transmission Control Protocol (TCP) and User Datagram Protocol (UDP).

6. An apparatus for determining a bit rate at which to deliver a packet stream over a network link, comprising:
   one or more processors; and
   one or more non-transitory computer-readable storage mediums storing one or more sequences of instructions, which when executed, cause:
      an origin device transmitting over the network link unsolicited data packets to a destination device while contemporaneously transmitting over the network link a first packet stream encoded at an initial bit rate to the destination device, wherein said unsolicited data packets are sent for purposes of placing a measurable load upon the network link and are dropped by the destination device for being unneeded, and
      the origin device determining whether the network link supports delivering a second packet stream in lieu of said first packet stream, wherein said second packet stream is encoded at a new bit rate, higher than said initial bit rate, which is based on an amount of retransmission requests the origin device receives for packets in said first packet stream from said destination device.

7. The apparatus of claim 6, wherein said origin device is a content delivery network (CDN) edge node, and wherein said destination device is a cable modem (CM).

8. The apparatus of claim 6, wherein said origin device operates at a cable headend, and wherein said destination device is a content delivery network (CDN) edge node.

9. The apparatus of claim 6, wherein said origin device and said destination device both execute video conference software, and wherein said video conference software determines, for said destination device, the new bit rate, and wherein the new bit rate is employed by said video conference software in transmitting video streams over said network link to said destination device.

10. The apparatus of claim 6, wherein said first packet stream is transmitted using one or more of Transmission Control Protocol (TCP) and User Datagram Protocol (UDP).

11. A method for determining a bit rate at which to deliver a packet stream over a network link, comprising:
   an origin device transmitting over the network link unsolicited data packets to a destination device while contemporaneously transmitting over the network link a first packet stream encoded at an initial bit rate to the destination device, wherein said unsolicited data packets are sent for purposes of placing a measurable load upon the network link and are dropped by the destination device for being unneeded, and
   the origin device determining whether the network link supports delivering a second packet stream in lieu of said first packet stream, wherein said second packet stream is encoded at a new bit rate, higher than said initial bit rate, which is based on an amount of retransmission requests the origin device receives for packets in said first packet stream from said destination device.

12. The method of claim 11, wherein said origin device is a content delivery network (CDN) edge node, and wherein said destination device is a cable modem (CM).

13. The method of claim 11, wherein said origin device operates at a cable headend, and wherein said destination device is a content delivery network (CDN) edge node.

14. The method of claim 11, wherein said origin device and said destination device both execute video conference software, and wherein said video conference software determines, for said destination device, the new bit rate, and wherein the new bit rate is employed by said video conference software in transmitting video streams over said network link to said destination device.

15. The method of claim 11, wherein said first packet stream is transmitted using one or more of Transmission Control Protocol (TCP) and User Datagram Protocol (UDP).

* * * * *